Jan. 3, 1928.
E. G. OAKLEY
1,655,105
BRIDGE WASHER FOR TIRE VALVES
Filed Dec. 28, 1923
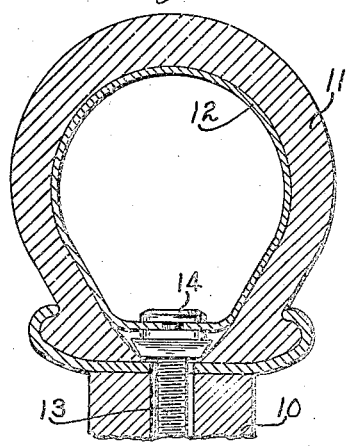
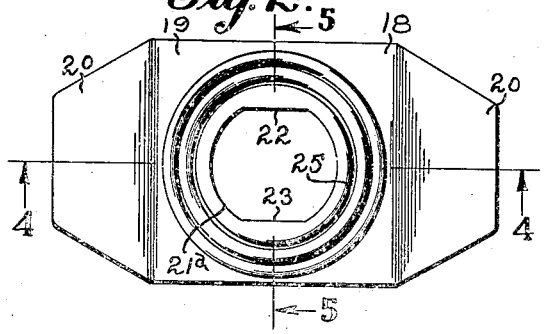
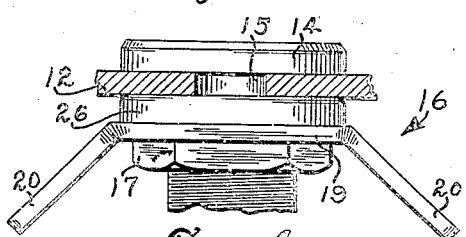
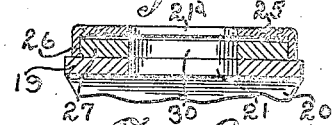
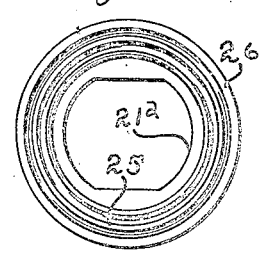
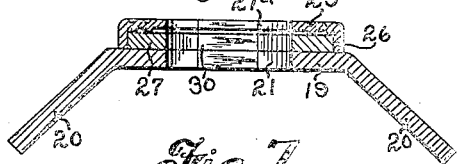
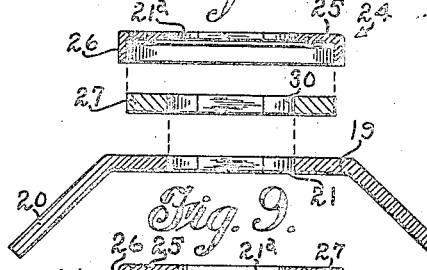
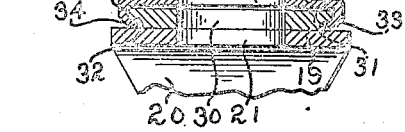
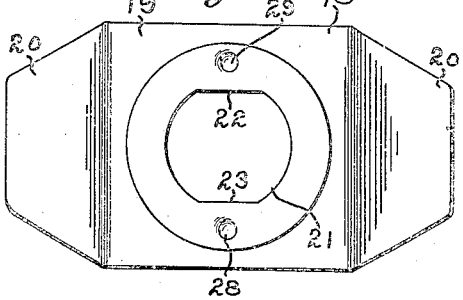
Inventor
Erastus G. Oakley
By Henry E. Rockwell
Attorney Patented Jan. 3, 1928.

1,655,105

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

BRIDGE WASHER FOR TIRE VALVES.

Application filed December 28, 1923. Serial No. 683,197.

This invention relates to bridge washers for tire valve stems and more particularly to a combined bridge washer and so-called ring washer, of improved construction.

Inner tubes of the pneumatic tires in use at the present time are commonly provided with what is termed a valve stem in the form of a shell or housing in which the valve proper is mounted. This valve stem is provided with a head or flange upon its inner end which is forced through an opening in the tube, the tube wall about such opening being then clamped against the head of the stem by a washer, commonly called a ring washer.

It is also necessary to provide some means of binding the outer casing or tire "shoe" to the rim, and for this purpose a bridge washer is also mounted upon the stem, the bridge washer usually comprising a somewhat elongated member provided with end flanges which are turned or bent downwardly or in a direction away from the ring washer.

Both the ring washer and bridge washer are then secured in place upon the valve stem by means of a nut which is threaded upon the stem to clamp the ring washer tightly against the tire, and to force the tire into close contact with the head of the stem.

It will be obvious that if the bridge washer and ring washer are made in one unit it will facilitate the assembly of these members upon the valve stem, and will also obviate any likelihood of one or the other of these members being omitted when the parts are assembled.

One object of my invention is to provide a combined bridge washer and ring washer of improved construction.

Another object of my invention is to porvide a combined bridge washer and ring washer in a unitary structure of simple character which may be cheaply manufactured.

A still further object of my invention is to provide a combined bridge washer and ring washer which may be manufactured more cheaply than those in common use at the present time, and which will at the same time be strong and durable, and which may be assembled upon the valve stem with facility and without likelihood of the parts becoming separated and lost.

A still further object of my invention is the provision of an improved means of connecting a ring washer to a bridge washer so as to unite the two parts into one structure.

To these and other ends, the invention consists in the novel features and combination of parts to be hereinafter described and claimed.

In the accompanying drawings:

Fig. 1 is a sectional view of a tire provided with a valve stem, having thereon a bridge washer embodying my improvements.

Fig. 2 is a top plan view of the bridge washer.

Fig. 3 is an enlarged, side elevational view of the bridge washer in place upon a valve stem.

Fig. 4 is a sectional view on line 4—4 of Fig. 2.

Fig. 5 is a sectional view on line 5—5 of Fig. 2.

Fig. 6 is a bottom plan view of the ring washer alone.

Fig. 7 is a top plan view of the bridge washer before the ring washer has been placed thereon.

Fig. 8 is a sectional composite view showing the various parts of my improved structure.

Fig. 9 is a sectional view similar to Fig. 5 showing a modification.

In Fig. 1 of the drawings I have shown in section a wheel rim at 10 upon which is mounted an outer casing, or tire shoe 11, within which is an inner tube 12. The inner tube is provided with the usual valve stem 13 through which it may be inflated, the stem having upon its inner end a head 14 adapted to be inserted within the tube through the opening 15.

My improved structure, consisting of a combined ring washer and bridge washer, designated generally by the numeral 16, is then placed upon the stem and serves to clamp the tube 12 tightly against the head 14 of the stem when the parts are drawn together by means of the nut 17 threaded upon the stem.

The bridge washer proper, designated generally by the numeral 18, is generally made of iron or steel on account of the strength and cheapness of this material. It comprises a flat body portion 19 provided at its ends with wings 20 which are tapered to some extent toward their ends and bent downwardly out of the plane of the body portion of the washer. This element is somewhat elongated in shape, as clearly shown in Fig. 7, and is provided with an opening 21 non-circular in shape, so that it is held against rotation relatively to the valve stem 13 on which it is placed, the valve stem having a cross section corresponding in shape to the opening in the washer. It is common to provide the valve stem and the washer opening with opposite flat sides 22 and 23 for this purpose.

The ring washer designated generally by the numeral 24 in Fig. 8 is made of brass or a similar non-oxidizing material, because such a substance enables it better to adhere to the rubber inner tube of the tire, and because the formation of rust would injure the rubber. The washer is usually circular in form, and is provided with annular corrugations 25 on its upper surface so that an air tight connection of the rubber tubing between this washer and the head 14 of the stem will be effected. It is also provided with an opening 21ª similar in shape to the cross section of the valve stem and the opening 21 in the bridge washer. An annular flange 26 is formed at the periphery of the ring washer to space the upper surface thereof a sufficient distance from the body portion 19 of the bridge washer, and to provide a novel and effective means of connecting the two elements together.

This connection is effected by securing to the upper surface 19 an auxiliary washer 27 which may be of any desired material, such as iron or steel, and may be secured in place in any well known manner. In practicing my invention, however, I have found it preferable and expedient to connect the element 27 to the bridge washer by a spot-welding process, a process which is cheaply performed and which will effectually secure the two parts together. The numerals 28 and 29 designate the two points where the elements have been welded by this process. The washer 27 is, of course, provided with an opening 30, similar in shape to that of the openings 21 and 21ª.

After the washer 27 has been secured in place upon the surface 19, the ring washer 24 is pressed over the auxiliary washer, the flange 26 frictionally gripping the peripheral edge of the auxiliary washer so that the ring washer and bridge washer will be effectually secured together. At the same time the auxiliary washer 27, which in practice will usually be made of cheaper material than the ring washer of brass or the like, will serve as a backing to strengthen the relatively thin metal in the upper surface of the ring washer.

It will be obvious that I have provided an extremely economical and simple device, combining in a unitary structure a bridge washer and a ring washer, the latter being made of a non-oxidizing material. Of this material, however, a relatively small quantity is used so as to maintain the cost of the structure as low as possible, and at the same time the strength of the article is not sacrificed, especially in view of the support given to the ring washer by the auxiliary washer 27.

In Fig. 9 I have shown a modified form of my invention, wherein the auxiliary washer 27 is provided with a recess or recesses 31 and 32 into which parts 33 and 34 of the ring washer are pressed. The remaining portion of the flange 26 has a somewhat loose fit over the periphery of the auxiliary washer, so that the ring washer will have a rotary motion relatively to the bridge washer. The recesses 31 and 32 may, if desired, be formed as a complete annular recess about the edge of the element 27, and if so formed, the entire lower edge of the flange 26 may be crimped into this recess. In such case the rotary movement of the ring washer would, of course, be limited by the shape of the opening 21ª and the shape of the cross section of the valve stem.

While I have shown and described some preferred embodiments of my invention, it will be understood that it is not to be limited to all of the details shown, but is capable of modification and variation within the spirit of the invention and within the scope of the appended claim.

What I claim is:

In combination, a bridge washer and a ring washer, an auxiliary washer secured to the bridge washer and having an undercut edge, said ring washer being provided with a peripheral flange engaging the undercut edge of the auxiliary washer to secure the ring washer thereto.

In witness whereof, I have hereunto set my hand this 19 day of December, 1923.

ERASTUS G. OAKLEY.